A. D. LEE.
OIL BURNER.
APPLICATION FILED AUG. 15, 1907.

903,736.

Patented Nov. 10, 1908.

Witnesses:
Howard Hanscom
Nathan C. Lombard

Inventor:
Alva D. Lee,
by Walter E. Lombard,
Atty.

UNITED STATES PATENT OFFICE.

ALVA D. LEE, OF BROOKLINE, MASSACHUSETTS.

OIL-BURNER.

No. 903,736.  Specification of Letters Patent.  Patented Nov. 10, 1908.

Application filed August 15, 1907. Serial No. 388,623.

*To all whom it may concern:*

Be it known that I, ALVA D. LEE, a citizen of the United States of America, and a resident of Brookline, in the county of Norfolk and State of Massachusetts, have invented certain new and useful Improvements in Oil-Burners, of which the following is a specification.

This invention relates to oil burners and has for its object the production of a burner in which the steam and air under pressure may be admitted in separate receptacles and thoroughly mixed with the oil before final discharge therefrom.

It has for a further object the production of such a device in which the discharge of oil, steam, or air into the mixing chamber may be nicely regulated so that the mixture of these ingredients may be of any desired proportion.

The invention consists of a casing having adjustably mounted therein a plurality of tubular members, the discharge outlets of which are in axial alinement with the discharge outlet in said casing, while the discharge orifice of the interior member is controlled by a suitable needle valve, which needle-valve and each of the tubular members are provided on their periphery with a plurality of spiral grooves adapted to act upon the ingredients passing through the annular spaces between said members to cause them to be spirally discharged into said mixing chamber in order that an effectual mixture of the ingredients be accomplished prior to their ignition.

The invention consists further in certain novel features of construction and arrangement of parts which will be readily understood by reference to the description of the drawings and to the claims hereinafter given.

Figure 1:
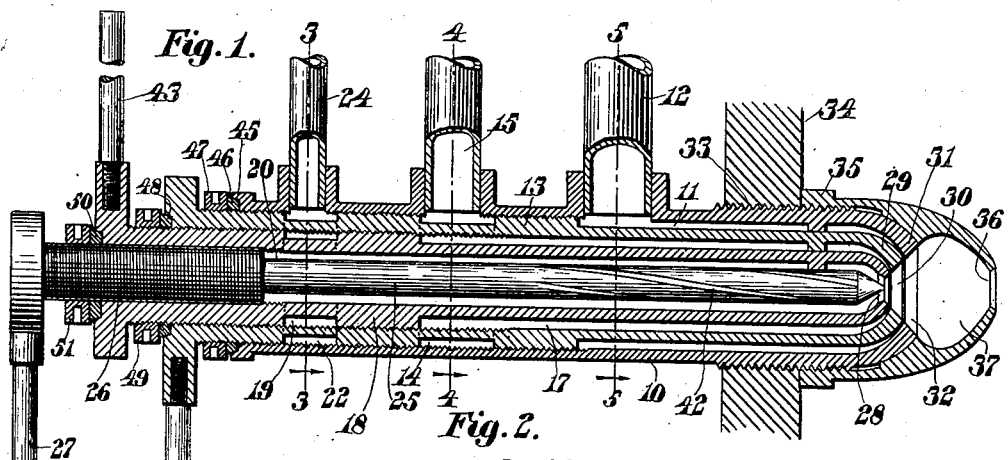
Figure 2:
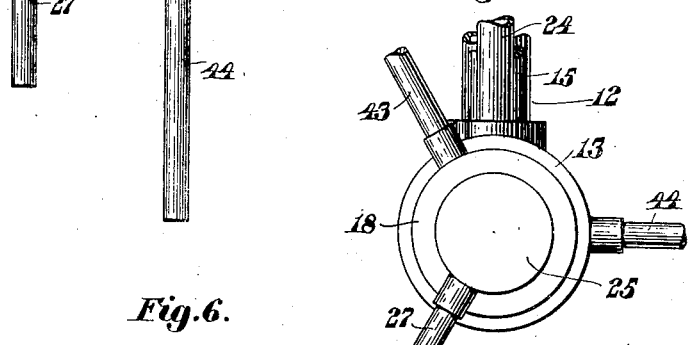
Figure 6:
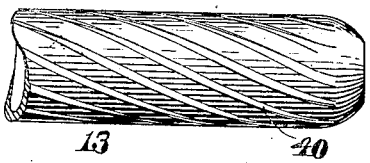
Figure 7:
Figure 3:
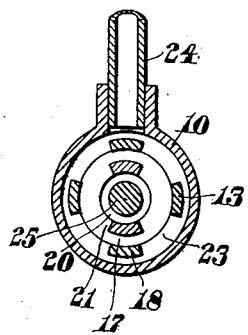
Figure 4:
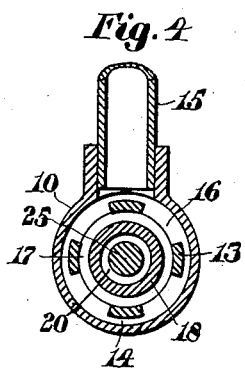
Figure 5:
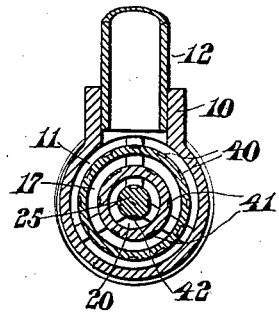

Of the drawings: Figure 1 represents a vertical section of a burner embodying the features of this invention. Fig. 2 represents a rear end view of the same. Figs. 3, 4, and 5 represent vertical transverse sections on lines 3—3, 4—4, and 5—5, respectively, on Fig. 1, and Figs. 6 and 7 represent elevations of the inner ends of the tubular members within the burner casing.

Similar characters designate like parts throughout the several figures of the drawings.

In the drawings, 10 represents a suitable casing the interior chamber 11 thereof communicating with an air inlet pipe 12 through which compressed air may be admitted to said chamber 11 from any suitable source of supply. Threaded to the interior of the casing 10 is a tubular member 13 provided with an annular groove 14 in its periphery which communicates with a steam inlet pipe 15 through which steam from any suitable source of supply may be admitted to said annular groove 14 and pass through the openings 16 into the interior chamber 17 of said tubular member. In a similar manner is mounted another tubular member 18 provided with an annular groove 19 in its periphery between which and the interior chamber 20 of said tubular member are a plurality of openings 21 while in the same plane with said annular groove is an annular peripheral groove 22 in the outer tubular member 13 communicating with the annular groove 19 by a plurality of openings 23 extending through said outer tubular member 13.

The annular groove 23 communicates with an oil pipe 24 through which oil under pressure from any suitable source of supply may be admitted through the annular grooves 22, openings 23, annular grooves 19, openings 21, to the interior chamber 20 of the inner tubular member 18. Within the inner tubular member 18 is a suitable needle valve 25 which is threaded at 26 to said tubular member 18 so that it may be adjusted by means of the handle 27 longitudinally thereof to control the discharge of oil from the chamber 20 through the discharge orifice 28 of said inner tubular member 18. The tubular member 13 is provided at its inner end with a contracted mouth 29 having a discharge orifice 30 while the inner end of the casing 10 is provided with a contracted mouth 31 having a discharge orifice 32.

The exterior of the inner end of the casing 10 is threaded at 33, said threaded portion 33 being screwed into the wall 34 of any receptacle in which it is desired to use said burner. Mounted upon said threaded portion 33 is a member 35 provided with a discharge orifice 36 between which and the discharge orifices 28, 30, and 32 is a mixing chamber 37 into which the air from the chamber 11, the steam from the chamber 17, and the oil from the chamber 20, are discharged and thoroughly mixed before their final discharge through the outlet 36 at which point the mixture is ignited.

The chambers 11, 17, and 20 are annular with their inner ends of smaller diameter than the main portion thereof so that as the different ingredients pass through these chambers they are discharged through the discharge orifices 28, 30, and 32 in such a direction as to cause the ingredients to impinge upon the inner walls of the member 35 within the mixing chamber 37 thereby effecting a thorough mixture of the various ingredients. To further facilitate this mixing of the ingredients the outer tubular member is provided with a plurality of spiral grooves 40 extending longitudinally of the periphery of said tubular member said grooves having a righthand twist. In a similar manner the periphery of the inner tubular member 18 is provided with a plurality of spiral grooves 41 extending longitudinally of the periphery of said tubular member 18, said spiral grooves having a lefthand twist. The needle valve 25 within the inner tubular member is likewise provided with a plurality of annular grooves 42 extending longitudinally of the periphery thereof, said grooves having a righthand twist. The effect of these grooves extending spirally, alternately in opposite directions is to cause the ingredients passing through the chambers 11, 17, and 20 to move in a torsional path in opposite directions so that when discharged into the mixing chamber 37 they will cross each other's path and cause them to be atomized and united in a gaseous mixture which will pass from the discharge orifice 36 in suitable condition to secure the best results when ignited.

The mouths 31 and 29 of the casing 10 and tubular member 13 are gradually increased in thickness toward the discharge orifices 32 and 30 so that the annular chambers between the casing 10 and the exterior of the outer tubular members 13 and the inner wall of said member 13 and the exterior of the inner tubular member 18 are gradually diminished so that the ingredients passing through these chambers under pressure pass through the discharge orifices 30 and 32 under increased velocity owing to the diminished outlet from said chambers.

All of the discharge outlets 28, 30, 32, and 36 are in axial alinement and the discharge through the outlets 28, 30, and 32 may be regulated by an adjustment of the needle valve 25 and the tubular members 18 and 13. The tubular member 18 is threaded to the interior of the tubular member 13 and is adjustable longitudinally thereof by means of the handle 43. In a like manner the tubular member 13 is threaded to the interior of the casing 10 and is adjustable longitudinally thereof by means of the handle 44. The outer end of the casing 10 is provided with an annular depression 45 in which is mounted an annular ring 46 of asbestos or other non-conductor of heat, said ring being compressed into said depression 45 and against the threaded portion of the tubular member 13 by means of a nut 47 operated in any well-known manner. This prevents any leakage between the casing 10 and the tubular member 13. In a similar manner the rear end of the tubular member 13 is provided with a suitable annular depression in which is mounted a similar annular ring 48 of asbestos or similar material which is controlled in like manner by means of a nut 49. The inner tubular member 18 is also provided with a ring 50 of asbestos or other non-conducting material pressed into a depression in the rear end thereof by means of the nut 51, these packing rings 48 and 50 preventing a leakage between the outer tubular member 13 and the inner tubular member 18 and the inner tubular member 18 and the threaded portion 26 of the needle valve. By means of such a construction as is herein shown the various ingredients to provide a suitable mixture for ignition may be admitted separately into annular chambers in axial alinement and have their velocity increased by being forced through narrowing apertures from which they are deflected in such a manner as to impinge upon the walls of the mixing chamber into which they are discharged while the grooves upon the peripheries of the various interior members act upon said ingredients in such a manner as to cause them to move in a spiral path in opposite directions thus causing the ingredients upon discharge from their separate chambers to cross each other's path and effect a most effective mixture thereof before final discharge from the mixing chamber 37.

It is believed that from the foregoing the operation and advantages of a construction such as is herein shown will be fully apparent without any further description.

Having thus described my invention, I claim:

1. In an oil burner, the combination of a casing provided with a plurality of inlets and a single outlet; of a plurality of tubular members adjustable longitudinally relative to each other within said casing provided with discharge outlets in alinement with the discharge outlet in said casing and having a plurality of spiral grooves extending longitudinally of the peripheral walls thereof; and an inlet to the interior of each of said tubular members communicating with one of said casing inlets.

2. In an oil burner, the combination of a casing provided with a plurality of inlets and a single outlet; of a plurality of tubular members adjustable longitudinally relative to each other within said casing provided with discharge outlets in alinement with the discharge outlet in said casing and having a plurality of spiral grooves extending longitudinally of the peripheral walls thereof;

an inlet to the interior of each of said tubular members communicating with one of said casing inlets; and a needle valve for closing the discharge outlet of the inner tubular member provided with a plurality of spiral grooves extending longitudinally thereof.

3. In an oil burner, the combination of a casing having a suitable inlet and discharge outlet; a plurality of tubular members within said casing each provided with a suitable inlet and discharge outlet, all of said outlets being in alinement with the discharge outlet from said casing, said casing having an inlet to the interior of each of said tubular members; and a member secured to the end of said casing provided with a mixing chamber into which the contents of said casing and tubular members are adapted to be discharged against the inner walls thereof.

4. In an oil burner, the combination of a casing having a suitable inlet and discharge outlet; a plurality of tubular members within said casing each provided with a suitable inlet and discharge outlet, all of said outlets being in alinement with the discharge outlet from said casing, said casing having an inlet to the interior of each of said tubular members; a needle valve for closing the discharge outlet for the interior tubular member; and a member secured to the end of said casing provided with a mixing chamber into which the contents of said casing and tubular members are adapted to be discharged against the inner walls thereof.

5. In an oil burner, the combination of a casing provided with a plurality of inlets and a single outlet; of a plurality of tubular members within said casing adjustable longitudinally thereof and to each other having their discharge outlets in alinement with that of said casing and provided on their peripheries with a plurality of spiral grooves, the grooves of each member extending in a different direction to those of the member surrounding it; an inlet to each of said tubular members communicating with one of said casing inlets; and means interposed between each tubular member and the member within it separating the contents thereof until ejected from the discharge orifices.

Signed by me at Boston, Mass., this 20th day of June, 1907.

ALVA D. LEE.

Witnesses:
 EDNA C. CLEVELAND,
 NATHAN C. LOMBARD.